Nov. 8, 1932.  T. H. IRELAND  1,887,205
HEATER ELEMENT
Filed Nov. 24, 1931
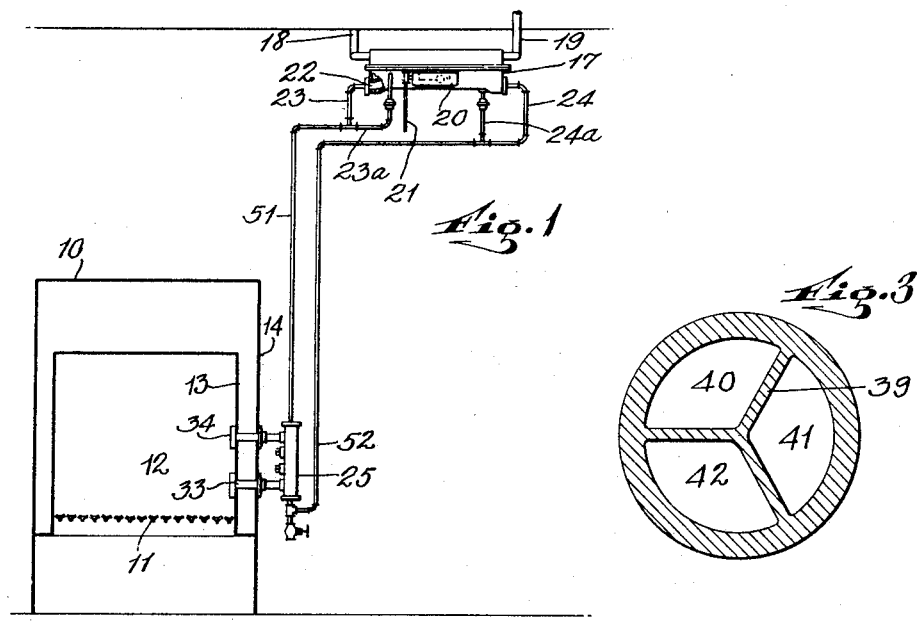
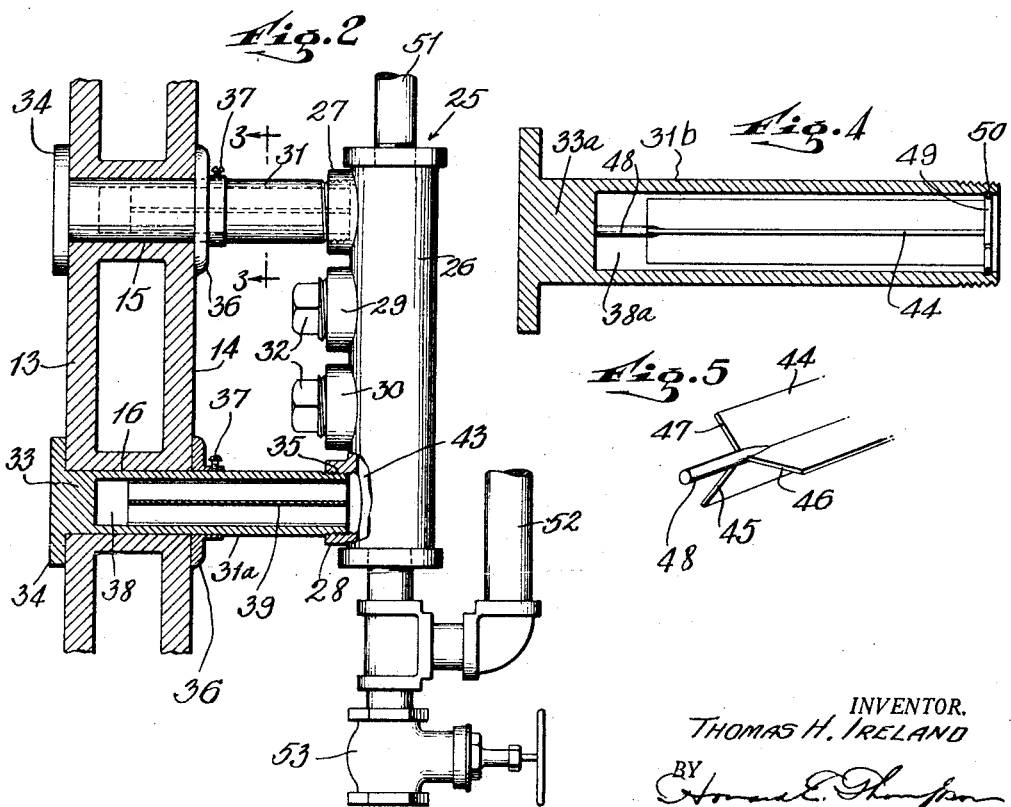
INVENTOR.
THOMAS H. IRELAND
BY
ATTORNEY Patented Nov. 8, 1932

1,887,205

UNITED STATES PATENT OFFICE

THOMAS H. IRELAND, OF ROCKVILLE CENTER, NEW YORK

HEATER ELEMENT

Application filed November 24, 1931. Serial No. 577,016.

This invention relates to heater elements for use in connection with boilers or other sources of heat supply; and the object of the invention is to provide an element involving one or more tubular bodies exposed to the fire box of a boiler or other heat medium, whereby the radiation of heat or heat flow through one end of said element will operate to heat water contained therein for any desired service, such for example, as heating the water of a humidifier; a further object of the invention being to provide a heating element of the class described involving a tubular body with a closed and relatively heavy end wall structure, the open end of said tubular body permitting the introduction and circulation of water therethrough and means within said tubular body for subdividing the same into separate passages, causing the flow of water into and through said elements; a further object being to provide an element of the class described including a flanged end wall with a collar adjustable longitudinally of said element, which in conjunction with the flange operates to mount and retain the member in connection with a suitable support; a still further object being to provide an element of the class described involving two tubular bodies and a fitting or fixture to which said bodies are coupled at spaced intervals, and whereby the circulation of water through the element to any source of supply or service may be carried out; and with these and other objects in view, the invention consists in a device of the class described and for the purpose specified which is simple in construction, efficient in use, and which is constructed as hereinafter described and claimed.

The invention is fully disclosed in the following specification, of which the accompanying drawing forms a part, in which the separate parts of my improvement are designated by suitable reference characters in each of the views, and in which:

Fig. 1 is a diagrammatic view, illustrating one use of my invention.

Fig. 2 is an enlarged, detail view of part of the construction shown in Fig. 1, with parts broken away and in section.

Fig. 3 is a section on the line 3—3 of Fig. 2 on an enlarged scale.

Fig. 4 is a detail view of one heater element which I employ, and showing a modification; and, Fig. 5 is a perspective view of part of the construction shown in Fig. 4, detached.

The heater element which forms the subject matter of my invention may have many adaptations and uses in the heating of water or other fluids for supplies and services of various kinds and classes. In the accompanying drawing, I have shown one of the many uses of my invention and one method of its installation, the use illustrated in the accompanying drawing being to supply water at the proper temperature to a humidifier for supplying the acquired moisture to a room or compartment, especially in cases where the said room or compartment, or several rooms and compartments are heated by what is known as hot water heat, wherein the temperature of the water under normal conditions is not sufficient to provide the proper supply of vapors to the room or compartment. I thus provide a water heating element which is coupled with the boiler of the hot water system whereby water at the proper temperature may be supplied to the humidifier, as will be apparent.

In the accompanying drawing, I have diagrammatically illustrated at 10 a boiler, 11 representing the grate thereof, 12 the fire box, 13 and 14 the inner and outer walls of the boiler having at spaced intervals ports or openings 15 and 16 arranged above the grate 11 and opening into the fire box 12 and outwardly through the outer wall 14. At 17, I have indicated a humidifier having an air inlet pipe 18 and outlet pipe 19, a flow tank 20 controlling the supply of water to the humidifier through a supply pipe 21, a relatively large pipe or passage 22 extending longitudinally through the tank of the humidifier through which water may be circulated through the inlet pipe 23 and outlet pipe 24, said pipes having branches 23a and 24a communicating with the tank proper of the humidifier for circulating hot water therethrough.

At 25, I have shown one form of my improved water heating unit, which in the construction shown comprises a tubular fitting 26 of conventional form having four tubular branches 27, 28, 29 and 30, adapting the fitting to different installations on boilers of various types. At 31 and 31a, I have shown two heating elements made according to my invention and constituting part of the heating unit, said elements being coupled with the tubular extensions 27 and 28 respectively, the extensions 29 and 30 being closed by plugs 32. Each element 31, 31a, is of similar construction, and consists of an elongated tube having a heavy closed end wall 33 terminating at its outer end in an enlarged flange 34 adapted to butt up against the inner face of the inner wall 13 of the boiler as shown, the outer end of said elements being in threaded engagement with the tubular extensions 27—28 as indicated at 35.

The elements 31 and 31a are passed through the openings 15 and 16 respectively formed in the boiler, and in attaching the same to the fitting 26, it will be understood that said elements are rotated in the openings 15 and 16 until drawn into a fully secured and sealed position with respect to the extensions 27 and 28. The flanged collars 36 are arranged on the elements 31, 31a, and are brought into abutting engagement with the outer surface of the outer wall 14 to secure the elements in position, the collars being retained against movement by set screws 37.

At the inner end of each element 31, 31a, is an uninterrupted chamber 38 disposed adjacent the wall 33. Outwardly of the chamber 38, the bore of said element is subdivided by a three-way web structure 39 into three independent passages 40, 41 and 42, which open outwardly through the open end of the element and into the bore or chamber 43 of the fitting 26. The purpose of this construction is to provide at least one of the chambers 40, 41 and 42 at the upper side of each element, and in like manner, one of said chambers at the lower side thereof, regardless of the position the element may assume after it has been turned in making its attachment with the fitting 26 so as to provide for natural circulation of water or other fluid through each element 31, 31a.

In Figs. 4 and 5 of the drawing, I have shown a slight modification in the construction of the heating element, and in Fig. 4, 31b represents an element similar to the elements 31, 31a, in general contour, but instead of forming the web structure 39 integral with the element, the independent passages are formed by a separate spacing member 44 having three radial partition walls 45, 46 and 47 equally spaced circumferentially with respect to each other. The inner end of the member 44 has a projecting pin 48 which strikes the closed end wall 33a of the element 31b and forms the annular space or chamber 38a similar to the chamber 38. The member 44 is held against displacement from the element 31b by a split ring 49 arranged in a groove 50 formed in the bore of the element 31b adjacent its open end. A supply or feed pipe 51 is coupled with the upper end of the heating unit or the fitting 26 thereof, the pipes 23 and 23a being coupled therewith, as clearly seen in Fig. 1 of the drawing, whereas another return pipe 52 is coupled with the lower end of the fitting 26, the pipe 51 being coupled with the pipes 24—24a. A valve 53 is employed in the pipe 52 adjacent its attachment to and below the fitting 26, so as to drain the water from the fitting, the elements 31, 31a, as well as from the humidifier, as will be apparent.

It will be understood that by mounting the relatively heavy end walls 33—33a of the heating elements 31, 31a, 31b, in connection with the boiler in the manner illustrated in Figs. 1 and 2 of the drawing, to expose the same to the fire box of the boiler, the heat of the fire box is transmitted directly to said heavy end walls and passed therethrough to heat the water in the chambers 38, 38a.

By reason of the fact that a comparatively small volume of water is present in the chambers 38, 38a, and the heat is intense, the water will be heated quickly and caused to circulate through the humidifier, providing proper functioning of the humidifier at all times, it being understood that the water entering the fitting 26 from the pipe 52 will pass into the lower chamber or compartment of the heating element 31a, into the chamber 38, out through an upper compartment, and the same circulation will take place through the element 31, and the heated water will pass upwardly through the pipe 51 and be introduced into the tank of the humidifier through the pipe 23a and also passed through the pipe or chamber 22 disposed in the humidifier, and will then be discharged through the pipes 24, 24a, and returned to the fitting 26 through the pipe 52. This circulation will continue, and as the water is vaporized, the supply will be replenished through the action of the float chamber 20 and the supply pipe 21.

As previously stated, many other uses of my invention than that herein specifically shown may be made. In other words, one or more of my heating elements may be used for heating the water of a hot water supply. In this connection, it will be understood that the heating element need not necessarily be coupled with a boiler, and the same may be introduced in connection with or exposed to a source of heat supply of any kind or class.

In this connection, it will be apparent that my invention is not necessarily limited to the use of two of the heating units as illustrated in the accompanying drawing, as one unit will perform the desired function and operation, it being understood that the fitting 26 may be constructed to suit different installations and uses, and various other changes in and modifications of the construction herein shown and described may be made within the scope of the appended claims without departing from the spirit of my invention or sacrificing its advantages.

Having fully described my invention, what I claim as new and desire to secure by Letters Patent, is:

1. A heating element of the class described comprising an elongated, tubular body having a closed end wall, means for heating said closed end wall, means coupled with said element whereby a fluid to be heated may be introduced into said element and exposed to the closed end wall thereof, means for subdividing said element into independent passages extending longitudinally therethrough to provide a circulation of fluid through said element in the process of heating the same, means on said element for securing the same to a suitable support adjacent the source of heat supply, said last named means involving an annular flange on the closed end of said element, and a collar adjustable longitudinally of said element and said flange.

2. A heating element of the class described comprising an elongated, tubular body, one end of said body being closed by a comparatively thick wall, an outwardly extending flange at the closed end of said body for retaining said body against movement in one direction with respect to a support, and other means mounted on said body for retaining the same against movement relatively to a support in the opposite direction.

3. A heating element of the class described comprising an elongated, tubular body, one end of said body being closed by a comparatively thick wall, an outwardly extending flange at the closed end of said body for retaining said body against movement in one direction with respect to a support, other means mounted on said body for retaining the same against movement relatively to a support in the opposite direction, and means for subdividing the bore of said tubular body into independent passages arranged longitudinally thereof.

4. A heating element of the class described comprising an elongated, tubular body, one end of said body being closed by a comparatively thick wall, an outwardly extending flange at the closed end of said body for retaining said body against movement in one direction with respect to a support, other means mounted on said body for retaining the same against movement relatively to a support in the opposite direction, and means for subdividing the bore of said tubular body into independent passages arranged longitudinally thereof, said means being arranged in spaced relation with the inner surface of the closed end wall of said body to place the separate chambers in communication with each other adjacent said closed wall.

5. A heating element of the class described comprising an elongated tubular body, one end of which is closed by an end wall and the other end of which is open, said body being adapted to be mounted in the wall of a heating unit to expose the closed end wall only of said body to the source of heat supply of said unit and with the open end of said body projecting from said unit, means on the closed end portion of said body for limiting outward movement of the body with respect to the wall of said unit, and other means on said body engaging the wall of said unit to retain the same against inward movement.

6. A heating element of the class described comprising an elongated tubular body, one end of which is closed by an end wall and the other end of which is open, said body being adapted to be mounted in the wall of a heating unit to expose the closed end wall only of said body to the source of heat supply of said unit and with the open end of said body projecting from said unit, means on the closed end portion of said body for limiting outward movement of the body with respect to the wall of said unit, other means on said body engaging the wall of said unit to retain the same against inward movement and said last named means involving a collar adjustable longitudinally of said body.

7. A heating element of the class described comprising an elongated tubular body, one end of which is closed by an end wall and the other end of which is open, said body being adapted to be mounted in the wall of a heating unit to expose the closed end wall only of said body to the source of heat supply of said unit and with the open end of said body projecting from said unit, means on the closed end portion of said body for limiting outward movement of the body with respect to the wall of said unit, other means on said body engaging the wall of said unit to retain the same against inward movement, said last named means involving a collar adjustable longitudinally of said body, and means coupled with the open end of said body whereby a fluid to be heated may be introduced into said body and exposed to the closed end wall thereof.

8. A water heating unit for use in connection with boilers comprising two tubular bodies, one end of each of said bodies being closed by a comparatively thick wall and including an outwardly extending flange adapted to engage the wall of the boiler to limit outward movement of said tubular bodies with respect thereto, said tubular bodies being arranged in spaced relation to each other and one above the other in the wall of said boiler, means adjustably supported on each of said tubular bodies for preventing inward movement thereof with respect to the wall of the boiler, and a tubular member coupled with the outer open ends of said tubular bodies to provide for the circulation of water into and through said tubular bodies and means in said tubular bodies for subdividing the bores thereof into independent longitudinal passages.

9. A water heating unit for use in connection with boilers comprising two tubular bodies, one end of each of said bodies being closed by a comparatively thick wall and including an outwardly extending flange adapted to engage the wall of the boiler to limit outward movement of said tubular bodies with respect thereto, said tubular bodies being arranged in spaced relation to each other and one above the other in the wall of said boiler, means adjustably supported on each of said tubular bodies for preventing inward movement thereof with respect to the wall of the boiler, a tubular member coupled with the outer open ends of said tubular bodies to provide for the circulation of water into and through said tubular bodies and means in said tubular bodies for subdividing the bores thereof into independent longitudinal passages, and water supply and discharge pipes coupled with the opposed ends of said member.

10. A heating element of the class described comprising an elongated tubular body having a comparatively thick closed end wall, means for mounting said body in connection with a heater unit to expose the closed end wall only thereof to the heat supply of said unit, means coupled with said element whereby a fluid to be heated may be introduced into said element and exposed to the closed end wall thereof, a partition member detachably mounted in said tubular body for subdividing the same into independent passages extending longitudinally therethrough to provide a circulation of fluid through said element in the process of heating the same, means on the inner end of said member for spacing the partitions thereof from the closed end wall to form a chamber placing the passages in communication with each other adjacent said closed end wall, and means for retaining said member against accidental displacement from said body.

In testimony that I claim the foregoing as my invention I have signed my name this 21st day of November, 1931.

THOMAS H. IRELAND.